April 28, 1942.   E. D. CLICKNER   2,281,481
FISHING REEL
Filed Aug. 1, 1940
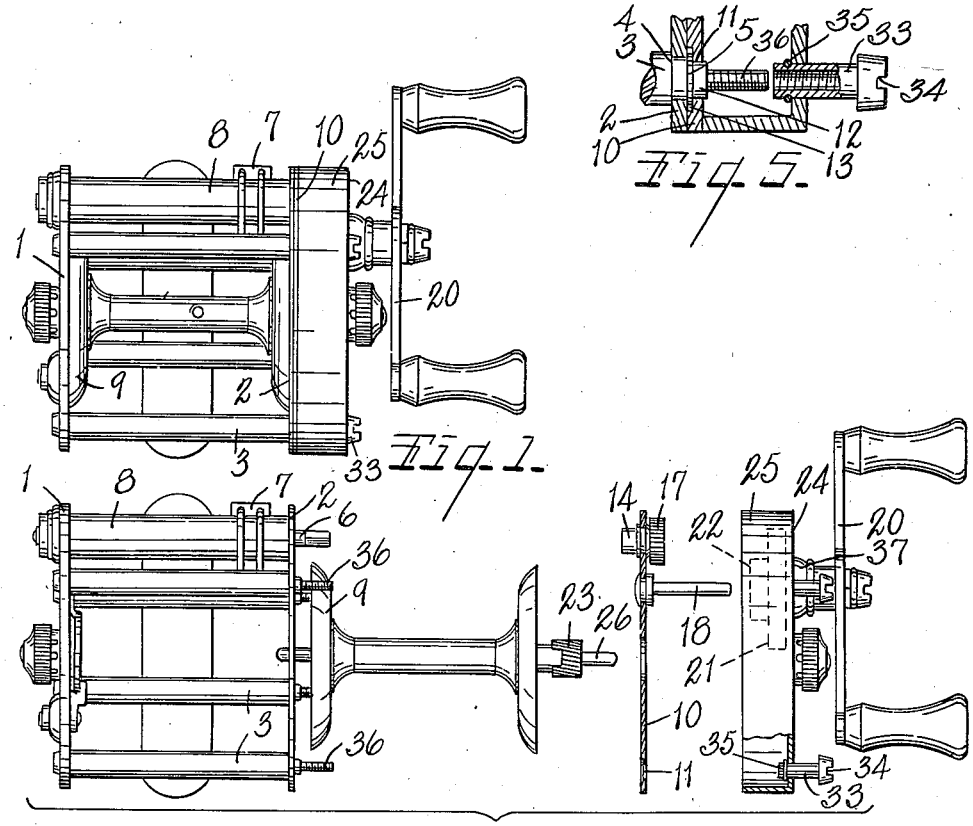
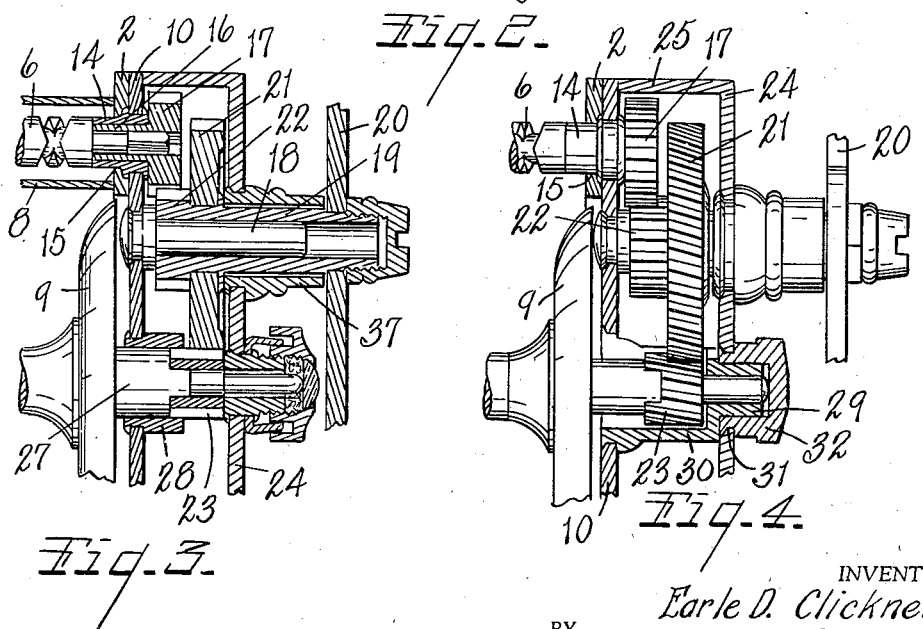
INVENTOR.
Earle D. Clickner
BY
Earl T. Chappell
ATTORNEYS Patented Apr. 28, 1942

2,281,481

UNITED STATES PATENT OFFICE 2,281,481

FISHING REEL

Earle D. Clickner, Kalamazoo, Mich., assignor to Shakespeare Company, Kalamazoo, Mich.

Application August 1, 1940, Serial No. 349,076

12 Claims. (Cl. 242—84.1)

This invention relates to improvements in fishing reels.

The main objects of this invention are:

First, to provide an improved fishing reel which may be disassembled for cleaning or other purposes without the aid of tools other than a coin, knife blade or the like.

Second, to provide a fishing reel structure in which the main bearing parts are assembled on a bearing supporting plate or member as a matter of accuracy and economy of manufacture, and also permitting the disassembly above contemplated.

Third, to provide a fishing reel in which the small parts are assembled with larger parts so that loss and annoyance resulting from losing parts when the reel is disassembled are materially reduced.

Objects pertaining to details and economies of the invention will definitely appear from the description to follow. The invention is defined in the claims.

A structure embodying the features of the invention is clearly illustrated in the accompanying drawing, in which:

Fig. 1 is a top plan view of a fishing reel embodying the features of the invention.

Fig. 2 is a disassembled or exploded view of the structure shown in Fig. 1.

Fig. 3 is an enlarged fragmentary view partially in section illustrating one embodiment of my invention.

Fig. 4 is an enlarged fragmentary view partially sectioned illustrating details of another embodiment of my invention.

Fig. 5 is an enlarged fragmentary view mainly in section showing details of the head cap securing means, the securing nuts being in disengaged position.

In the embodiment of the invention illustrated the frame comprises an end plate or member 1 and a second end member 2, the latter being a ring or annular in character with connecting pillars 3. The pillars 3 are shouldered at 4 to receive the end member or ring 2 which is secured thereon by upsetting the pillars as indicated at 5 in Fig. 5 or by other suitable securing means. The end member 2 is preferably fixedly and permanently secured to the pillars, that is, it is not intended that the end member 2 shall be freed from the pillars in the ordinary use and disassembling of the reel for cleaning and other purposes.

The level wind mechanism comprises the reversely threaded traversing shaft 6 and the line guide carriage 7. The details of these parts are not illustrated as they form no part of this invention. The shaft 6 is provided with a protecting housing or guard 8. The spool 9 is removable through the end member 2.

I provide a bearing plate or bearing support 10 which in the preferred embodiment is of the same diameter as the end member 2 and is disposed in side by side relation thereto, having openings 11 to receive the reduced ends 12 of the pillars as shown in Fig. 5. The inner side of the bearing plate is recessed at 13 to receive the end plate retaining upset. This bearing plate in the embodiment of Figs. 1 and 2 is provided with a traversing shaft pinion bearing 14 projecting inwardly through an opening 15 in the end member 2 and adapted to receive the hub-like spindle 16 of the traversing shaft pinion 17. This bearing plate also carries a stub shaft 18 adapted to receive the sleeve-like crank shaft 19, the crank 20 being secured to this shaft. The shaft is provided with a spool driving pinion 21 and with a gear or pinion 22 meshing with the pinion 17 when the parts are in assembled relation. The gear 21 meshes with the spool pinion 23 when the parts are assembled. The crank shaft 19 is assembled on the head cap 24, the flanged portion 25 of which is adapted to abut the outer side of the bearing supporting plate.

In the structure shown in Figs. 1 and 2, the spool spindle 26 engages in a bearing carried by the head cap. In the embodiment of Fig. 3 the spool is provided with a journal portion 27 which engages in a bearing 28 carried by the bearing support or plate. In the embodiment shown in Fig. 4 the spool spindle bearing 29 is carried by a bracket-like extension 30 on the bearing supporting plate, the bearing portion proper extending through the head plate into a cap-like member 32 mounted in an opening 31 in the head plate.

The head cap is retained by means of the elongated nuts 33 which have kerfs 34 in their outer ends adapted to receive a coin or the like for manipulating the nuts. In the embodiment illustrated these nuts are retained by the split rings 35 so that they are at all times in assembled relation to the head cap but are in detachable relation to the threaded extension portions 36 of the pillars. The head cap is provided with a tubular extension 37 which serves to support the crank shaft when the head cap is engaged or removed. When the head cap is in assembled relation the crank shaft is supported by the stub shaft 18.

The members 2 and 10 serve to support and reinforce each other and, as a matter of fact, in the commercial embodiments the combined thickness of these members is substantially the thickness of the end member 1, which enables their embodiment in or assembly with various standard parts of reels of this general type.

Another important advantage of construction is that the mounting of the bearings on one bearing supporting plate enables a more accurate spacing of these bearings as operations of piercing, assembling or reaming can be done at one setting, thus preserving accurately the center distances for the gear trains. When part of the bearings are in one plate and part in another, variations when the different parts are assembled commonly result. To get the accuracy that is possible with applicant's present structure would mean very great care in manufacturing and assembling the parts.

When it is desired to clean any of the bearing parts the head cap may be freed and there are no loose parts to become lost. The gears and other parts of the spool are readily accessible for cleaning or oiling.

I have illustrated and described my improvements in embodiments which I have found highly satisfactory. I have not attempted to illustrate or describe other embodiments or adaptations which might be possible, as it is believed the disclosure made will enable those skilled in the art to embody the invention as may be desired.

Having thus described the invention what I claim as new and desire to secure by Letters Patent is:

1. The combination in a level winding reel, of a frame including pillars and an annular end member mounted thereon, certain of the pillars having threaded extensions extending beyond said end member, a spool, the opening in said end member permitting insertion and removal of the spool therethrough, a bearing plate removably engaged with said pillars and of a diameter corresponding to said end member and lying in side by side relation thereto when the bearing plate is engaged with the pillars, said bearing plate being provided with an inwardly projecting traversing shaft pinion bearing, an outwardly projecting stub shaft adapted to receive a crank shaft having main and level wind driving gears thereon, and an outwardly projecting spool shaft bearing, said end member having an opening therein adapted to receive said traversing shaft pinion bearing, a removable head cap adapted to abut said bearing plate when in assembled position, said bearing plate being freely removable when said head cap is removed, nuts mounted on said head cap for coaction with said threaded extensions of said pillars, said nuts being mounted on said head cap for axial and rotatable movement thereon and provided with means on the inner side of the head cap for preventing withdrawal of the nuts therefrom, and a crank shaft assembled with said head cap for supporting engagement with said stub shaft when the head cap is in assembled position.

2. The combination in a level winding reel, of a frame including pillars and an annular end member mounted thereon, certain of the pillars having threaded extensions extending beyond said end member, a spool, the opening in said end member permitting insertion and removal of the spool therethrough, a bearing plate removably engaged with said pillars and of a diameter corresponding to said end member and lying in side by side relation thereto when the bearing plate is engaged with the pillars, said bearing plate being provided with an inwardly projecting traversing shaft pinion bearing, an outwardly projecting stud shaft adapted to receive a crank shaft having main and level wind driving gears thereon, said end member having an opening therein adapted to receive said traversing shaft pinion bearing, a removable head cap adapted to abut said bearing plate when in assembled position, said bearing plate being freely removable when said head cap is removed, nuts mounted on said head cap for coaction with said threaded extensions of said pillars, said nuts being mounted on said head cap for axial and rotatable movement thereon and provided with means on the inner side of the head cap for preventing withdrawal of the nuts therefrom, and a crank shaft assembled with said head cap for supporting engagement with said stub shaft when the head cap is in assembled position.

3. The combination in a fishing reel, of a frame including pillars and an annular end member mounted thereon, certain of the pillars having threaded extensions extending beyond said end member, a spool, the opening in said end member permitting insertion and removal of the spool therethrough, a bearing plate removably engaged with said pillars having a traversing shaft receiving bearing, a stub shaft and a spool shaft receiving bearing, a removable head cap adjusted to abut said bearing plate when in assembled position, nuts mounted on said head cap for coaction with said threaded extensions of said pillars, said nuts being mounted on said head cap for axial and rotatable movement thereon and provided with means on the inner side of the head cap for preventing withdrawal of the nuts therefrom, and a crank shaft provided with a spool driving gear drivingly associated with the spool shaft and a level wind driving pinion drivingly associated with the traversing shaft, said crank shaft being assembled with said head cap for supporting engagement with said stub shaft when the head cap is in assembled position.

4. The combination in a fishing reel having rotatable actuating means associated therewith, of a frame including a plurality of threaded pillars and an annular end member mounted thereon and fixedly secured thereto, a spool, the opening in said end member permitting insertion and removal of the spool therethrough, a bearing supporting plate removably engaged with said pillars and of a diameter corresponding to said end member and lying in side by side relation thereto when the bearing supporting plate is engaged with the pillars, said plate having bearing means thereon receiving said rotatable actuating means, a removable head cap adapted to abut said bearing supporting plate when in assembled position, said bearing supporting plate being freely removable when said head cap is removed, and threaded attaching elements carried by said head cap for threaded coaction with said pillars, said attaching elements being assembled with and removable with said head cap.

5. The combination in a level winding reel, of a frame including pillars and an annular end member mounted thereon, a spool removable through said end member, a bearing plate removably engaged with said pillars and provided with a traversing shaft bearing, a stub shaft adapted to receive a crank shaft and a spool shaft bearing, a removable head cap adapted to clamp said bearing plate in position when said head cap is in assembled position, and a crank shaft provided with a spool driving gear and level wind driving gear assembly on said head cap for supporting engagement with said stub shaft when the head cap is in assembled position.

6. The combination in a level winding reel, of a frame including pillars and an annular end member mounted thereon, a spool removable through said end member, a bearing plate removably engaged with said pillars and provided with a traversing shaft bearing and a stub shaft adapted to receive a crank shaft, a removable head cap adapted to clamp said bearing plate in position when said head cap is in assembled position, and a crank shaft provided with a spool driving gear and level wind driving gear assembly on said head cap for supporting engagement with said stub shaft when the head cap is in assembled position.

7. The combination in a fishing reel, of a frame including pillars and an annular end member mounted thereon, a spool removable through said end member, a bearing plate removably engaged with said pillars and provided with traversing shaft, crank shaft and spool bearing elements removable therewith, and a removable head cap constituting a retaining member for said bearing plate, said head cap having a driving crank and driving gear assembly assembled therewith for supporting engagement with said crank shaft bearing element when the head cap is in assembled position and for retaining assembly with the head cap when the head cap is released.

8. The combination in a fishing reel, of a frame including pillars and an annular end member mounted thereon, a spool removable through said end member, a bearing plate removably engaged with said pillars and provided with traversing shaft and crank shaft bearing elements removable therewith, and a removable head cap constituting a retaining member for said bearing plate, said head cap having a driving crank and driving gear assembly assembled therewith for supporting engagement with said crank shaft bearing element when the head cap is in assembled position and for retaining assembly with the head cap when the head cap is released.

9. The combination in a fishing reel, of a frame including pillars and an annular end member mounted thereon, a spool removable through said end member, a bearing member removably engaged with said pillars and provided with a bearing, a removable head cap constituting a retaining member for said bearing member, securing elements mounted on said head cap for removal therewith and having a retaining connection thereto so that when released they are retained in assembled relation therewith, said elements releasably engaging said pillars to hold the cap in operative relation to said frame end member and said bearing member, said head cap having a driving crank and driving gear assembly assembled therewith for supporting engagement with the bearing on said bearing member when the head cap is in assembled position and for retaining assembly with the head cap when the head cap is released.

10. The combination in a fishing reel having rotatable actuating means associated therewith, of a frame including a plurality of threaded pillars and an annular end member mounted thereon and fixedly secured thereto, a spool removable through said end member, a bearing supporting member removably engaged with said pillars, said bearing supporting member having bearing means thereon receiving said rotatable actuating means, a removable head cap constituting a retaining member for said bearing supporting member, and securing elements threadedly engageable with the pillars mounted on said head cap for removal therewith and having a retaining connection thereto so that when released they are retained in assembled relation therewith.

11. The combination in a fishing reel, of a frame including pillars and an annular end member mounted thereon, said pillars projecting outwardly of said end member, a spool removable through said end member, a removable bearing support adjacent said end member receiving said pillars and provided with traversing shaft, crank shaft and spool bearing elements removable therewith, a removable head cap constituting a retaining member for said bearing support, and securing elements mounted on said head cap for removal therewith and having a retaining connection thereto so that when released they are retained in assembled relation therewith, said elements releasably engaging said pillars to hold said head cap and bearing support in operative relation to said end member.

12. The combination in a fishing reel, of a frame including pillars and an anular end member mounted thereon, said pillars projecting outwardly of said end members, a spool removable through said end member, a removable bearing support adjacent said end member receiving said pillars and provided with traversing shaft and crank shaft bearing elements removable therewith, a removable head cap constituting a retaining member for said bearing support, and securing elements mounted on said head cap for removal therewith and having a retaining connection thereto so that when released they are retained in assembled relation therewith, said elements releasably engaging said pillars to hold said head cap and bearing support in operative relation to said end member.

EARLE D. CLICKNER.